(12) United States Patent
Koona et al.

(10) Patent No.: US 12,719,832 B2
(45) Date of Patent: Aug. 25, 2026

(54) CLOUD COMMENT STORAGE USING PER-ARTIFACT KEY

(71) Applicant: SAP SE, Walldorf (DE)

(72) Inventors: Siddiq Ahmed Koona, Bangalore (IN); Bharani Lingamaneni, Vijayawada (IN); Sahana Durgam Udaya, Bangalore (IN)

(73) Assignee: SAP SE, Walldorf (DE)

( * ) Notice: Subject to any disclaimer, the term of this patent is extended or adjusted under 35 U.S.C. 154(b) by 513 days.

(21) Appl. No.: 17/850,323

(22) Filed: Jun. 27, 2022

(65) Prior Publication Data

US 2023/0421537 A1 Dec. 28, 2023

(51) Int. Cl.
*H04L 9/40* (2022.01)
*H04L 9/14* (2006.01)

(52) U.S. Cl.
CPC ............ *H04L 63/0254* (2013.01); *H04L 9/14* (2013.01)

(58) Field of Classification Search
None
See application file for complete search history.

(56) References Cited

U.S. PATENT DOCUMENTS 11,489,669 B1 * 11/2022 Rafanavicius ........ H04L 9/0891
2008/0320319 A1 * 12/2008 Muller .................... G06F 21/78 713/193
2010/0333116 A1 * 12/2010 Prahlad ................. G06F 3/0626 713/153
2019/0340251 A1 * 11/2019 Peddada ................... H04L 9/16
2022/0104105 A1 * 3/2022 Raffa .................. H04L 65/4015

OTHER PUBLICATIONS

Anonymous "Collaboration for Stories", SAP Analytics Cloud, Q2 2022, dated Jun. 16, 2022, 4 pages.
Anonymous "Comment Encryption Within Customer Landscape", 2021, 23 pages.

* cited by examiner

*Primary Examiner* — Kevin S Mai
(74) *Attorney, Agent, or Firm* — Fountainhead Law Group, PC

(57) ABSTRACT

Confidentiality and privacy of user comments are preserved by encryption of comments stored on the cloud. A migration engine and a crypto server including an encryption engine, are positioned behind a firewall from the cloud storage. In response to a comment migration instruction (e.g., •onboarding, •offboarding, or •key rotation), the migration engine performs batch processing across the firewall to retrieve a comment and comment metadata from the cloud storage. The migration engine forwards the comment/comment metadata behind the firewall to the crypto server. Based upon the comment metadata, the encryption engine uses a key for encrypting or decrypting the comment. Once encrypted or decrypted, the comment is returned to the migration engine for forwarding across the firewall and storage on the cloud. Encrypting or decrypting comments using a key determined from comment metadata, can impart flexibility to comment migration (e.g., allowing an administrator to selectively rotate compromised or expired keys).

18 Claims, 14 Drawing Sheets

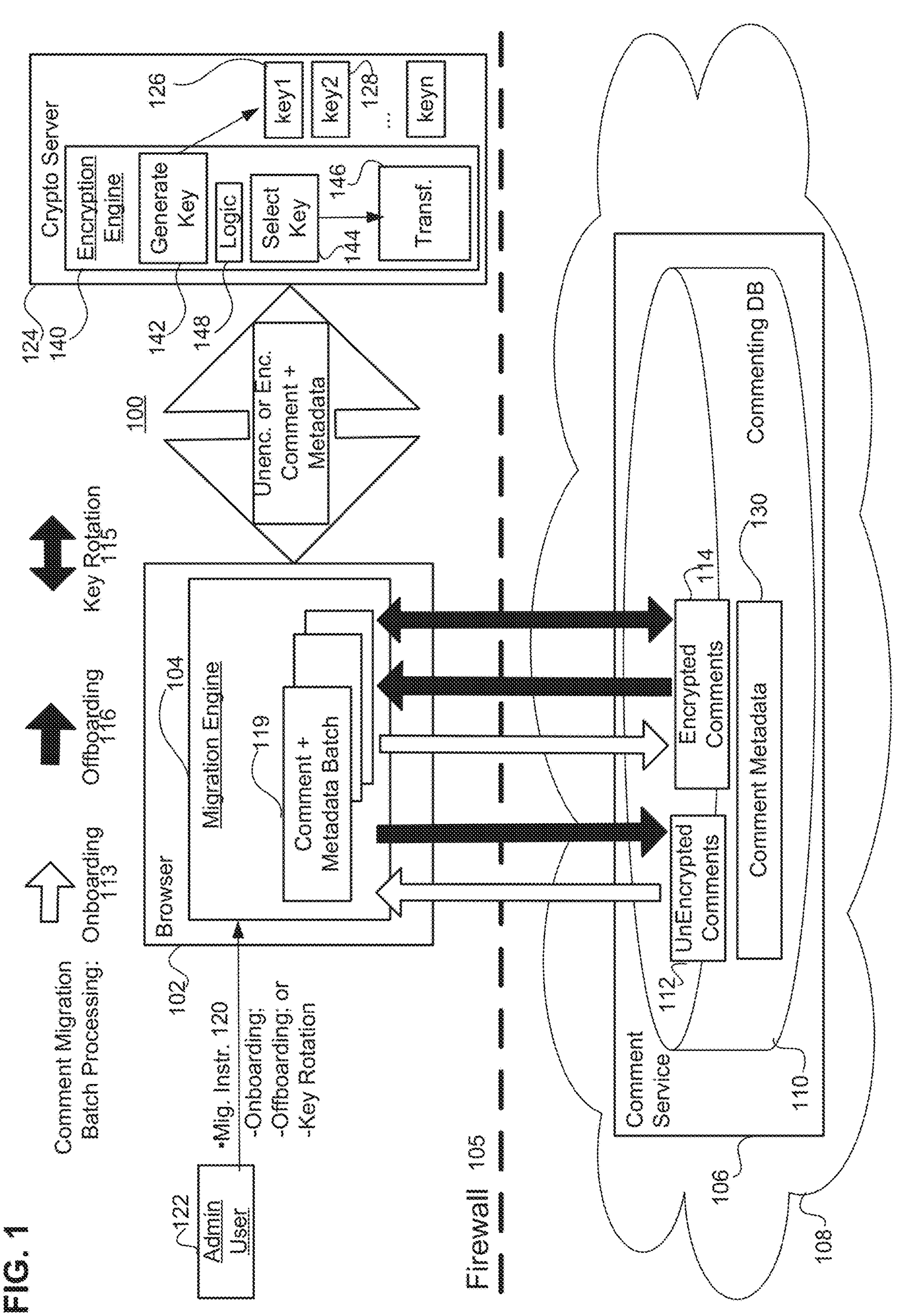
FIG. 1
Comment Migration Batch Processing:
Onboarding 113
Offboarding 116
Key Rotation 115
100
Crypto Server
124
Encryption Engine
140
Generate Key
142
Logic
148
Select Key
144
Transf.
146
key1
126
key2
128
...
keyn
Unenc. or Enc. Comment + Metadata
Browser
102
Migration Engine
104
Comment + Metadata Batch
119
Admin User
122
•Mig. Instr. 120
-Onboarding;
-Offboarding; or
-Key Rotation
Firewall 105
Comment Service
106
Commenting DB
110
UnEncrypted Comments
112
Encrypted Comments
114
Comment Metadata
130
108

Tenant
Story

Tenant
Model
Story

Tenant
Model
Analytic Application

Tenant
Model

Figure 10:
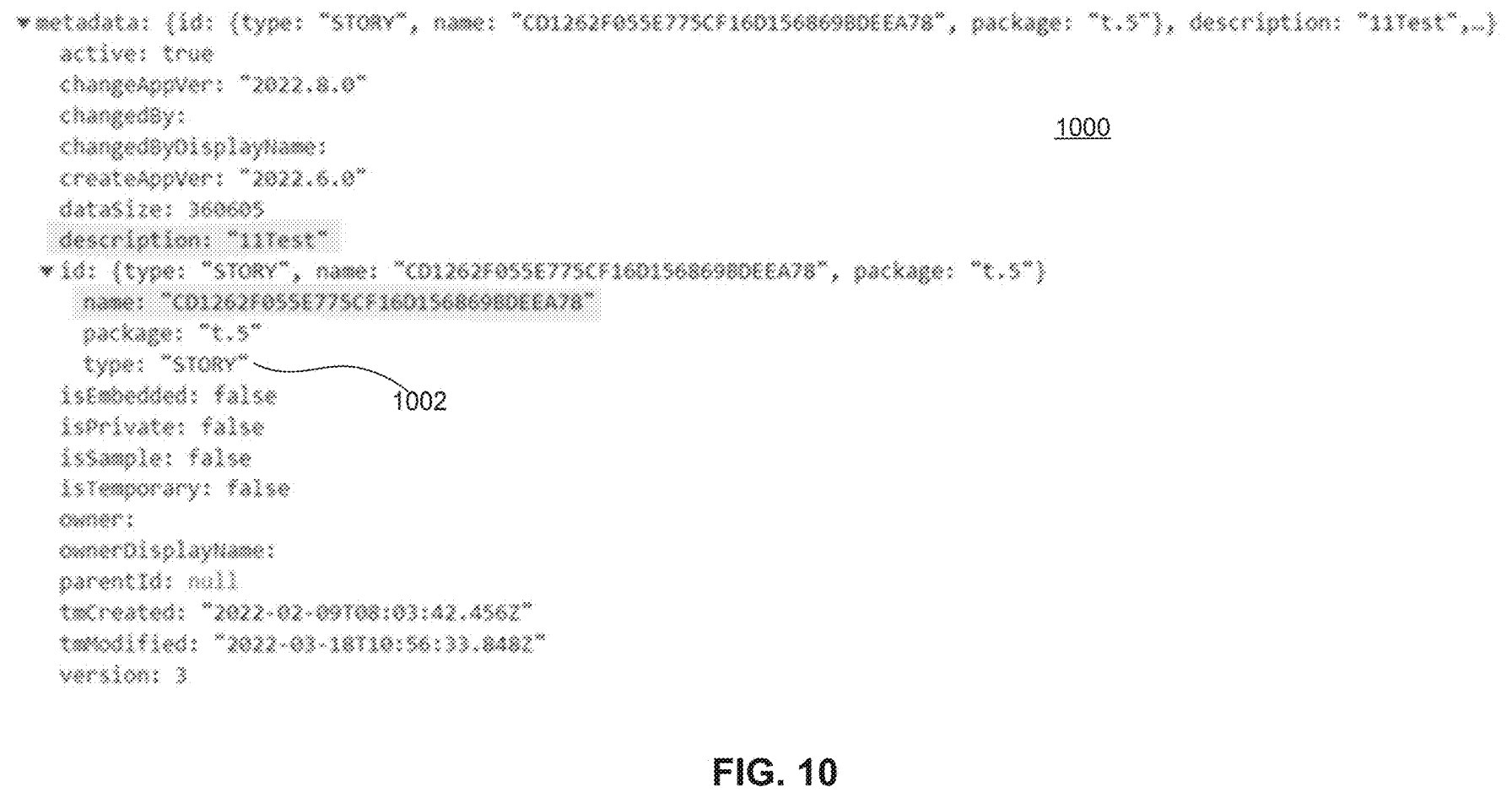

1000

▼metadata: {id: {type: "STORY", name: "CD1262F055E775CF16D156869BDEEA78", package: "t.5"}, description: "11Test",…}
active: true
changeAppVer: "2022.8.0"
changedBy:
changedByDisplayName:
createAppVer: "2022.6.0"
dataSize: 360605
description: "11Test"
▼id: {type: "STORY", name: "CD1262F055E775CF16D156869BDEEA78", package: "t.5"}
name: "CD1262F055E775CF16D156869BDEEA78"
package: "t.5"
type: "STORY"
isEmbedded: false
isPrivate: false
isSample: false
isTemporary: false
owner:
ownerDisplayName:
parentId: null
tmCreated: "2022-02-09T08:03:42.456Z"
tmModified: "2022-03-18T10:56:33.848Z"
version: 3

CLOUD COMMENT STORAGE USING PER-ARTIFACT KEY

BACKGROUND

Unless otherwise indicated herein, the approaches described in this section are not prior art to the claims in this application and are not admitted to be prior art by inclusion in this section.

Multiple software applications are increasingly subject to complex deployments in one or more cloud environments. In one possible example, software used to perform analytics upon current activity, may need to efficiently communicate with separate applications relating to availability of resources and forecasting of future activity.

The insertion of user comments can facilitate effective collaboration resulting in the discovery of valuable insights. By analyzing multiple visualizations, various users can contribute their insights in the form of comments, and thereby communicate specific observations to other users.

SUMMARY

Confidentiality and privacy of user comments are preserved by encryption of comments stored on the cloud. A migration engine and a crypto server including an encryption engine, are positioned behind a firewall from the cloud storage. In response to a comment migration instruction (e.g., onboarding, offboarding, or key rotation), the migration engine performs batch processing across the firewall to retrieve a comment and comment metadata. The migration engine forwards the comment and comment metadata behind the firewall to the crypto server. Based upon the comment metadata, the encryption engine generates a key, and then selects that key for encrypting or decrypting the comment. Once encrypted or decrypted, the comment is returned to the migration engine for forwarding across the firewall and storage on the cloud.

Comment encryption or decryption according to a key specifically determined from metadata of the comment, can impart enhanced security by rendering the system less vulnerable to plain text-based attacks. Embodiments may also impart flexibility, for example allowing an administrator to selectively rotate only keys that are compromised or expired, and thereby reducing downtime and processing burden associated with a mass migration of comments to/from cloud storage.

The following detailed description and accompanying drawings provide a better understanding of the nature and advantages of various embodiments.

BRIEF DESCRIPTION OF THE DRAWINGS

FIG. 1 shows a simplified diagram of a system according to an embodiment.

FIG. 10 shows an example story metadata with attributes.

DETAILED DESCRIPTION

Figure 2:
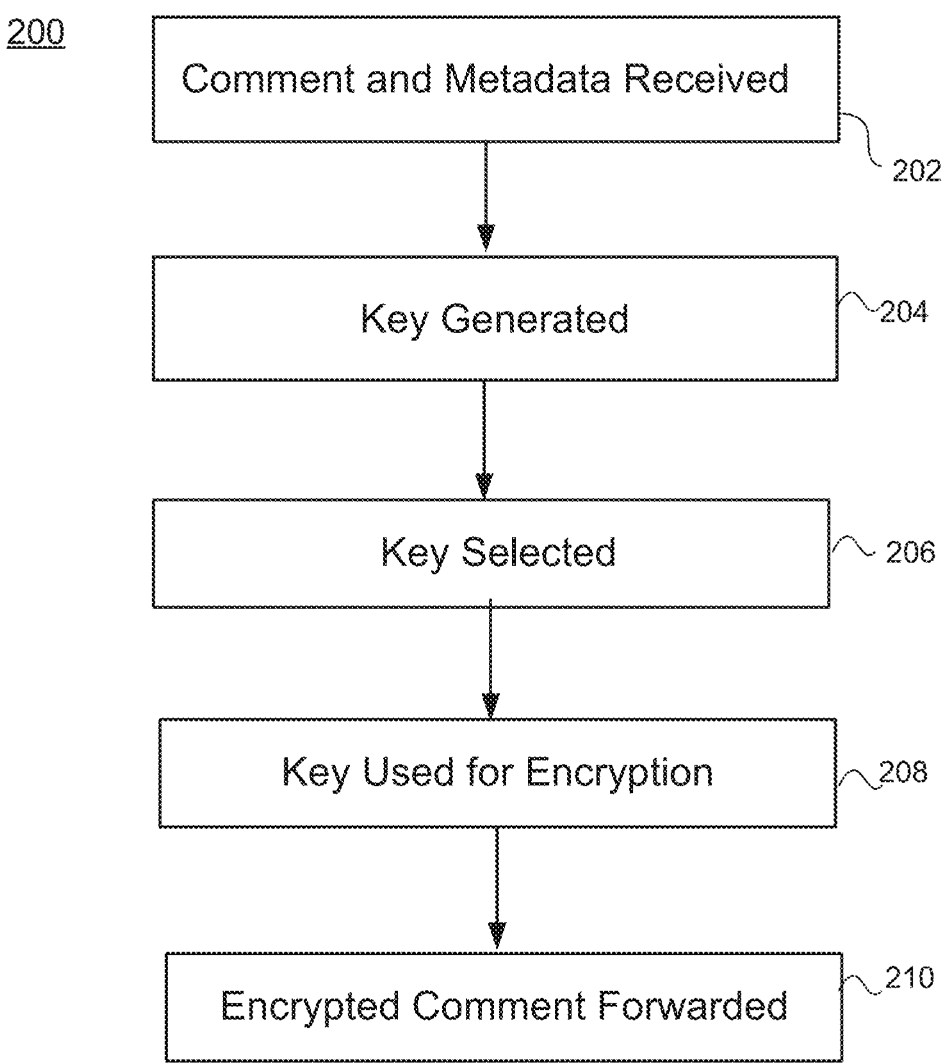
FIG. 2 shows a simplified flow diagram of a method according to an embodiment.

Described herein are methods and apparatuses that perform migration of comments in a manner supporting rotation of keys in a cloud environment. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

FIG. 1 shows a simplified view of an example system that is configured to implement comment migration according to an embodiment. The system 100 comprises a browser 102 that includes a migration engine 104.

The browser is positioned across a firewall 105 (e.g., on-premise) from a comment service 106 that is present in the cloud 108. The comment service references a commenting database 110.

The commenting database may include comments in unencrypted form 112. Such unencrypted comments may be eligible for onboarding migration operations 113 as is discussed herein.

The commenting database may include comments in encrypted form 114. Such comments are eligible for a key rotation migration operations 115 in order to strengthen their security.

Moreover, the encrypted comments stored in the commenting database are also eligible for offboarding comment migration operations 116. Such offboarding may occur where a customer decides to opt out of having the comments stored on the cloud by the commenting service in encrypted form.

As shown in FIG. 1, based upon a comment migration instruction 120 (received, e.g., from a first administrative user 122), the migration engine may undertake to perform batch processing of comments with the comment service.

Such batch comment processing may comprise an onboarding operation, where unencrypted comments present in the commenting database are retrieved by the migration engine, forwarded to a crypto server 124, encrypted using a key (e.g., key1 126), and then sent back across the firewall in encrypted form for cloud storage.

Batch comment processing may comprise an offboarding operation. There, encrypted comments present in the commenting database are retrieved by the migration engine, forwarded to the crypto server, decrypted using a key (e.g., key1), and then sent back across the firewall in decrypted form.

Batch comment processing may also comprise a key rotation operation. There, encrypted comments in the commenting database are retrieved by the migration engine, forwarded to the crypto server, decrypted using a first key (e.g., key1), reencrypted using a different key (e.g., key2 128), and then sent back across the firewall in encrypted form.

Comment migration processes may be mass operations, involving the handling of large volumes of comments. As described herein, such migration operations may involve the processing of comments in batches 119 in order to achieve efficient handling and not overwhelm the browser. It is noted that the batches may include not only the comments, but also comment metadata as is now discussed.

Specifically, in addition to storing the comments themselves, the commenting database also stores comment metadata 130. This comment metadata is relevant to a particular comment.

Examples of comment metadata can include, but are not limited to one or more of:

- artifact type (e.g., story, model, application, others) with which the comment is associated;
- an identity of the individual creator of the comment;
- a specific team of collaborators allowed to access the comment;
- a role (e.g., user, manager, administrator) of the creator of the comment;
- relation of comment to other comments—e.g., tagged, response to earlier comment
- time/date—e.g., of creation of comment and/or of related comment
- security level
- a batch number of the comment
- content of the comment—e.g., as determined by Machine Learning (ML) and/or Natural Language Processing (NLP) techniques
- a language of the comment
- system considerations—e.g., resource (processing, memory, and/or bandwidth) availability
- other Embodiments enhance the flexibility and security of storing comments on the cloud, by basing comment encryption/decryption at least in part upon the comment metadata. In particular, generating and/or selecting a key at the crypto server references the comment metadata accompanying the comment.

Specifically, as shown in FIG. 1, an encryption engine 140 of the crypto server receives the comment and the associated metadata, from the migration engine. In the specific context of an onboarding migration operation, the received comment is in unencrypted form.

The encryption engine functions to reference the comment metadata to generate 142 a relevant key (e.g., key1). The encryption engine then selects 144 the generated key, transforms (e.g., encrypts) 146 the comment according to that key, and then returns the encrypted comment to the migration engine. The migration engine then forwards the encrypted comment back to the comment service for storage in encrypted form.

In the context of an offboarding migration operation, the comment received by the crypto server from the migration engine is encrypted. In that context, the encryption engine selects the previously generated key (e.g., key1), transforms (e.g., decrypts) the comment according to that key, and then returns the unencrypted comment to the migration engine. The migration engine then forwards the unencrypted comment back to the remote comment service for storage.

In the context of a key rotation migration operation, the comment received by the crypto server from the migration engine is encrypted. Upon receipt of that comment from the migration engine, the encryption engine selects the previously generated key (e.g., key1), transforms (e.g., decrypts) the comment according to that key. Then, the encryption engine again transforms (e.g., reencrypts) the comment according to another key (e.g. key2) based upon the metadata and key rotation logic 148.

The reencrypted comment is then returned back to the migration engine. The migration engine forwards the reencrypted comment back across the firewall for storage on the cloud in encrypted form.

FIG. 2 is a flow diagram of a method 200 according to an embodiment. At 202, a comment and comment metadata is received.

At 204, a key is generated from the comment metadata. At 206 the key is selected based upon the comment metadata.

At 208, the key is utilized to encrypt the comment. At 210, the encrypted comment is forwarded for communication across a firewall to remote storage.

Further details regarding comment migration according to various embodiments, are now provided in connection with the following example.

EXAMPLE

An example of an embodiment of performing comment migration is now described in connection with the SAP Analytics Cloud (SAC) available from SAP SE of Walldorf, Germany SAC is a cloud platform that combines analytics and predictive capabilities.

The analytics content (e.g., model, story, visualizations) promotes the discovery of previously unrecognized patterns in order to boost productivity. Hence, allowing multiple users to collaborate across analytics content is useful.

Commenting under SAC offers the ability to collaborate without having to exit the application. Such commenting may offer one or more of the following characteristics.

1. rapid interaction between users;
2. offer context sensitive feedback on specific elements in a story, analytic application, and/or data point model;
3. act as an "Emphasizer", i.e. as a cover page or as a summary at the end of a report;
4. make normal report significantly more meaningful;
5. provide granular access control ie rights or access control;
6. tag users during comment—tagged users receive an email;

The emergence of cloud-based applications, has resulted in different traversal paths to the data, e.g., from on-premise to different nodes managed by the cloud. Eventually, however, at least some portion part of the data ends up stored outside premises on the cloud.

Such cloud storage can raise security concerns. In particular, relevant user comments that are part of data stored on the cloud lie outside of an on-premises firewall, and at least theoretically are subject to exposure.

Figure 3:
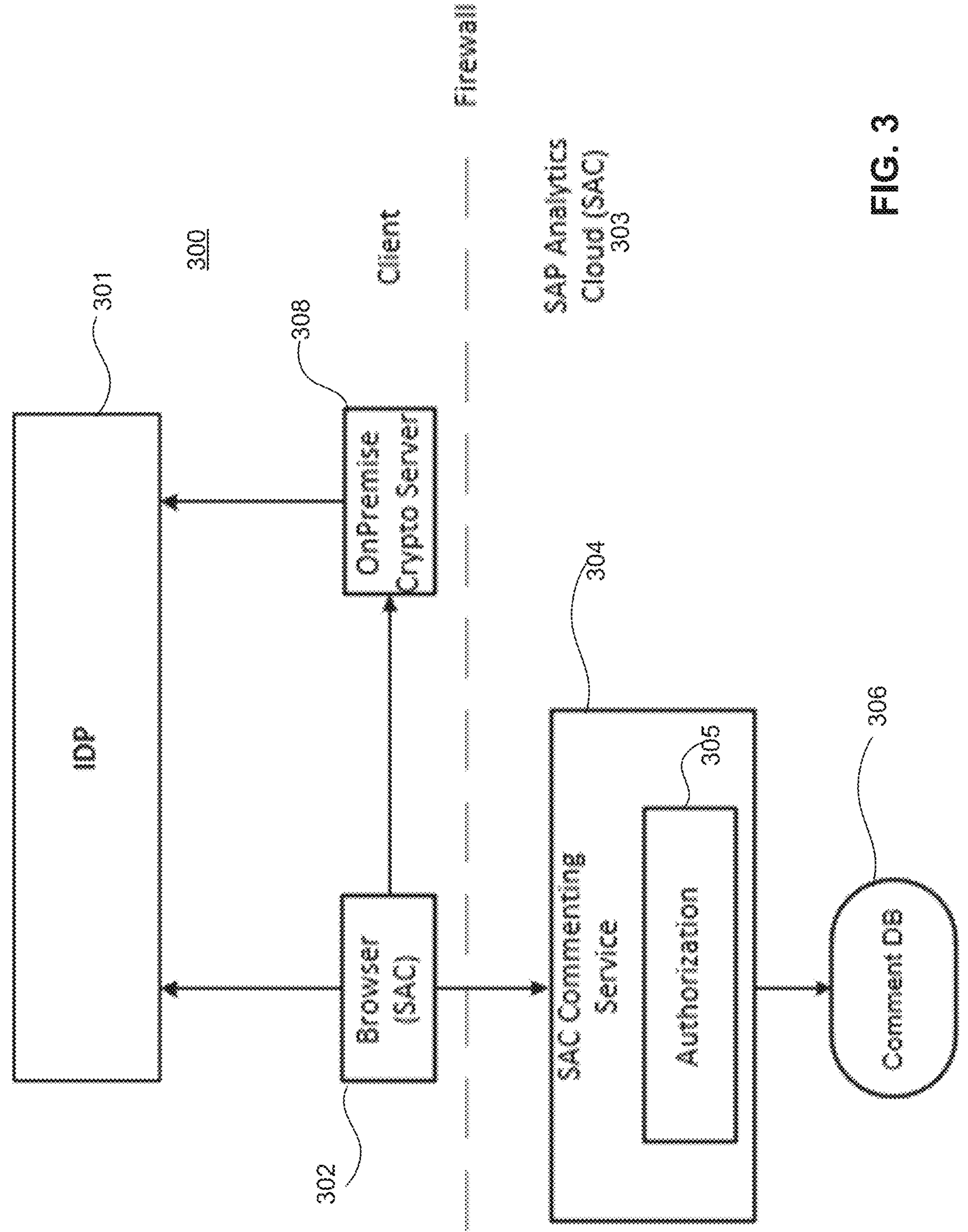
FIG. 3 shows an overview of a system according to an example.

Thus according to some embodiments, comments may be encrypted at the customer premises, with only encrypted comment text entering the SAP Cloud. FIG. 3 shows a simplified view of an architecture 300 according to an example that includes an Identify Provider (IDP) 301.

In particular, the browser layer 302 executes HTTP REST endpoints on SAC Commenting Service 304 of SAC 303 to add comments or retrieve existing comments. The SAC Commenting Service validates if the user has authorization 305 to gain access on the story, model, and dimensions contained in the payload. The SAC Commenting Service also facilitates the Create, Read, Update and Delete (CRUD) operations into the database 306.

The on-premise crypto server 308 is an additional server that is hosted on the customer premises. The role of the crypto server is to encrypt and decrypt the comment text that is passed as input.

Any comment that is to be saved within the SAC Commenting Service, would first be encrypted by the crypto server and only then be saved. Thus, the comment text ends up in SAC as an encrypted text that can only be decrypted by the appropriate crypto server.

Similarly, when comments are to be rendered on to the UI, the browser sends the encrypted text to the crypto server. That crypto server then decrypts the comments which are finally rendered on the UI.

The encryption of comments may be performed by keys that are periodically rotated. As the comments are encrypted outside SAC, but then migrated for storage within SAC, any key rotation procedure may ensure all the existing comments which are encrypted with an old key, are decrypted with same key before new key is applied.

Such key rotation should be implemented in a manner that ensures data confidentiality is maintained with respect to comments not leaving customer premises in clear text form. Moreover, as existing comments are to be migrated, issues of scale versus performance with key rotation may arise. In addition, comment migration should efficiently handle errors arising during the migration process and roll back to previous state. Lastly, service unavailability due to comment migration and key rotation should be minimal.

A number of different possible use cases for comment migration may arise. For example, FIG. 4 shows comments associated with analytic content in the form of a story artifact.

Figures 4, 5, 6, 7:
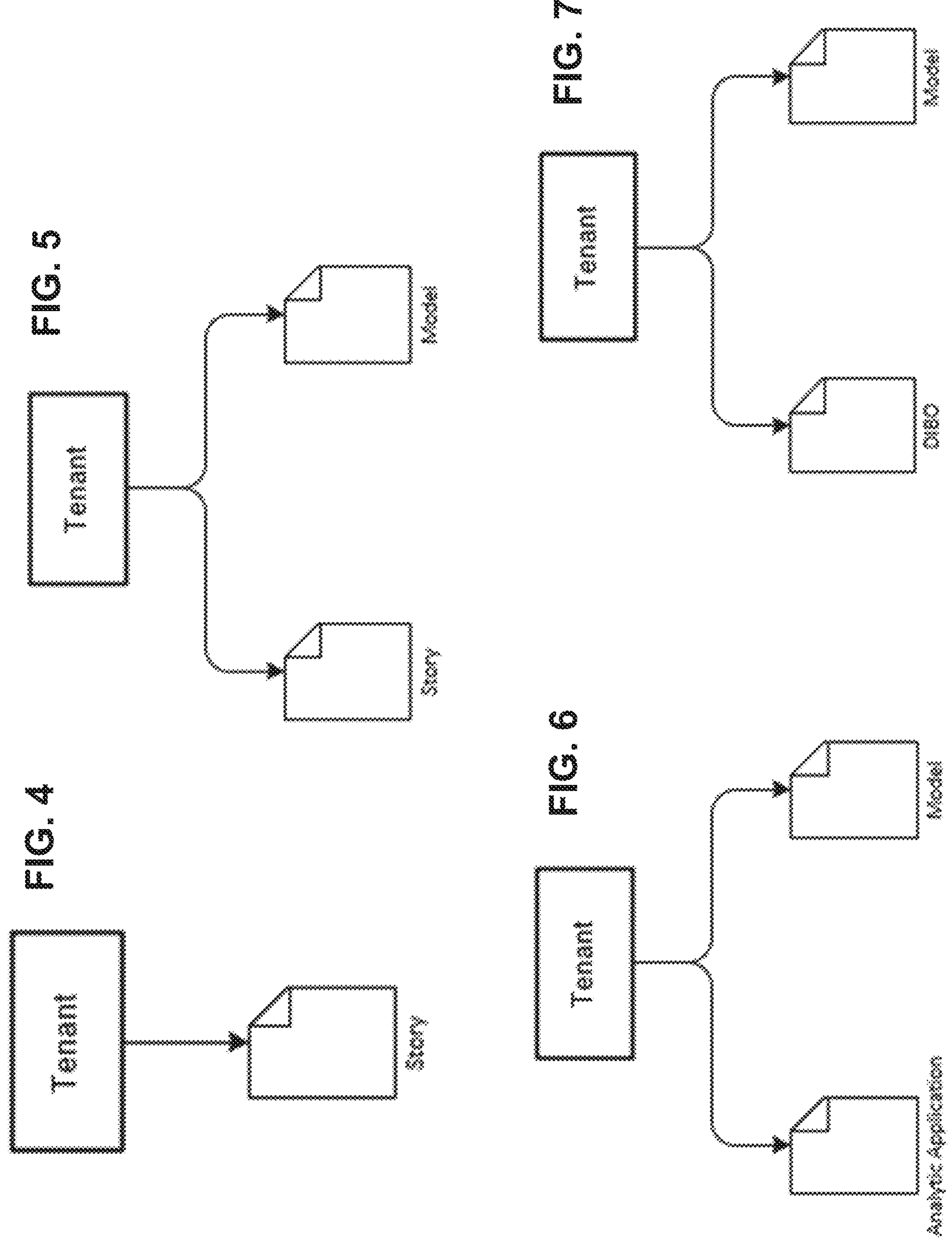
FIGS. 4-7 show possible use cases.

In addition, FIG. 5 shows comments associated with story and model artifacts. FIG. 6 shows comments associated with analytic application and model artifacts. FIG. 7 comments associated with Digital Boardroom (DIBO) and model artifacts.

Figure 8:
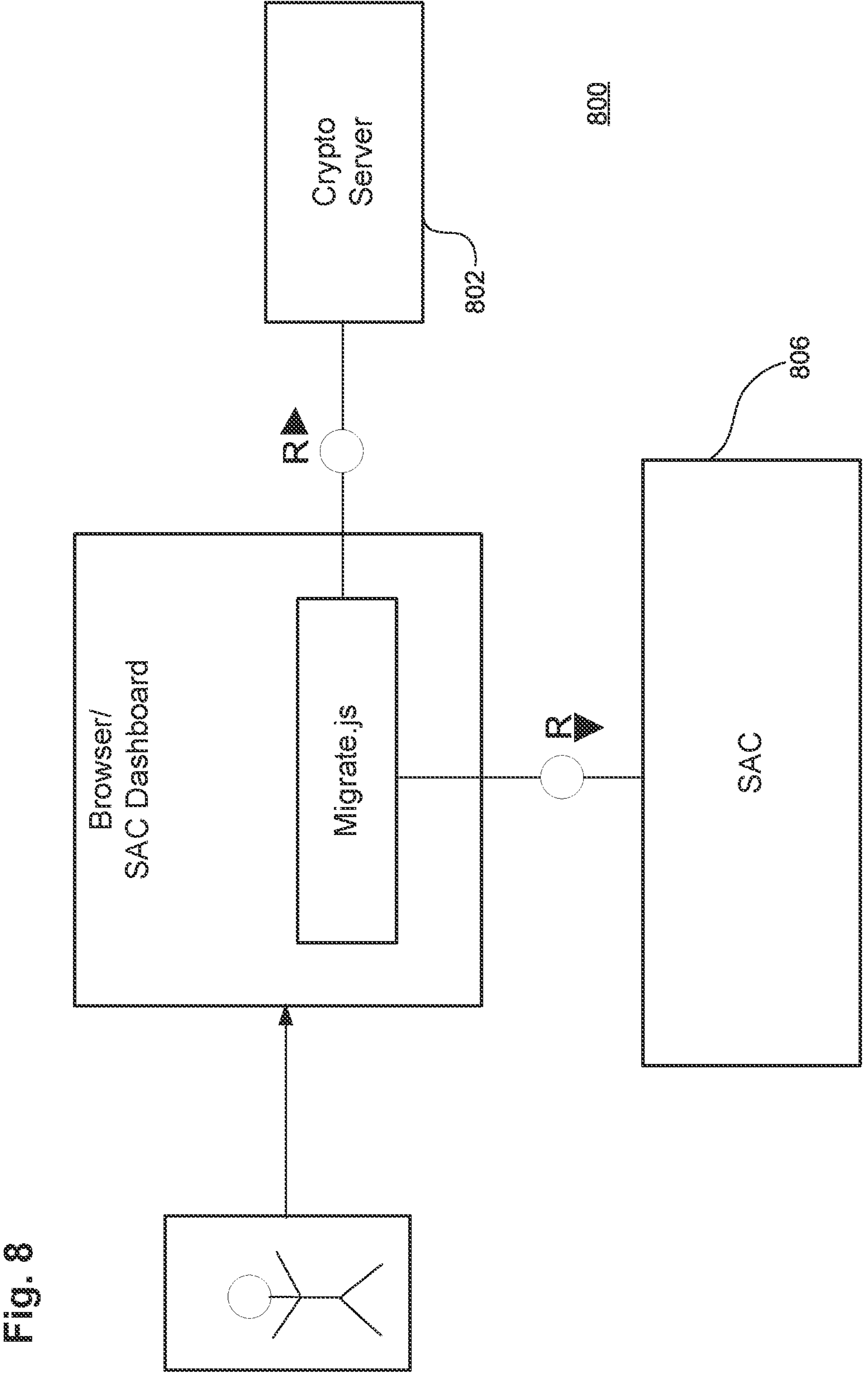
FIG. 8 shows an overview of the role of a crypto server according to an embodiment.

In order to accommodate these use cases in the context of secure storage within the cloud, embodiments implement a light weight browser to orchestrate support for migration of comments from plain-text to encrypted and vice-versa, and to support key rotation. FIG. 8 shows a simplified view of such a browser orchestrated migration architecture.

This architecture 800 implements the on-premises crypto server 802 which would be installed and run within the customer's firewall, and interact smoothly with the existing SAC platform 806. Comments are migrated by the on-premises crypto server, but continue to reside within SAC landscape.

As part an onboarding procedure, new customers board onto the encryption feature. After onboarding, any new comments will be encrypted by default.

Figure 9:
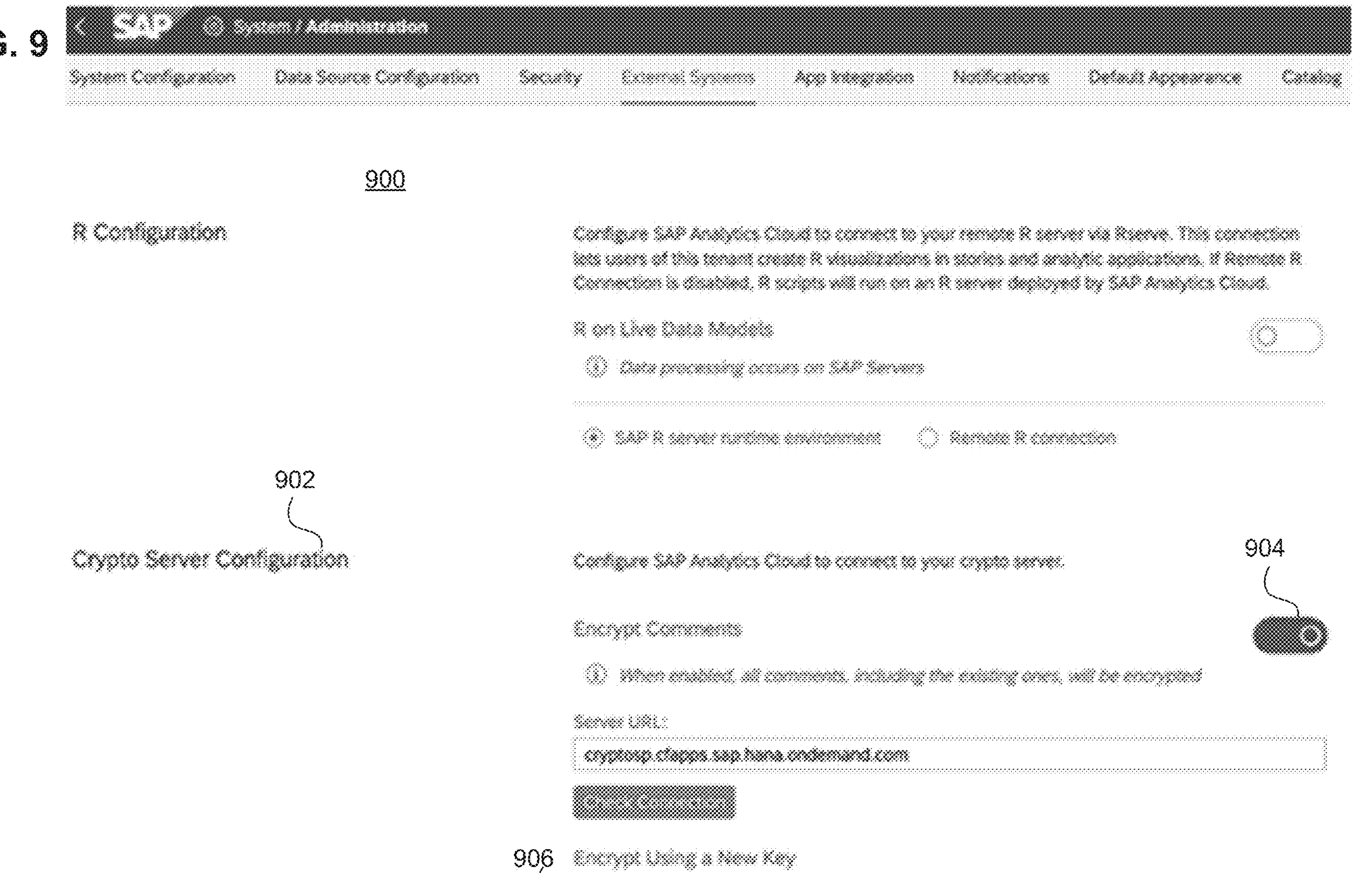
FIG. 9 shows a sample screen shot of an example user interface.
Figure 15A:
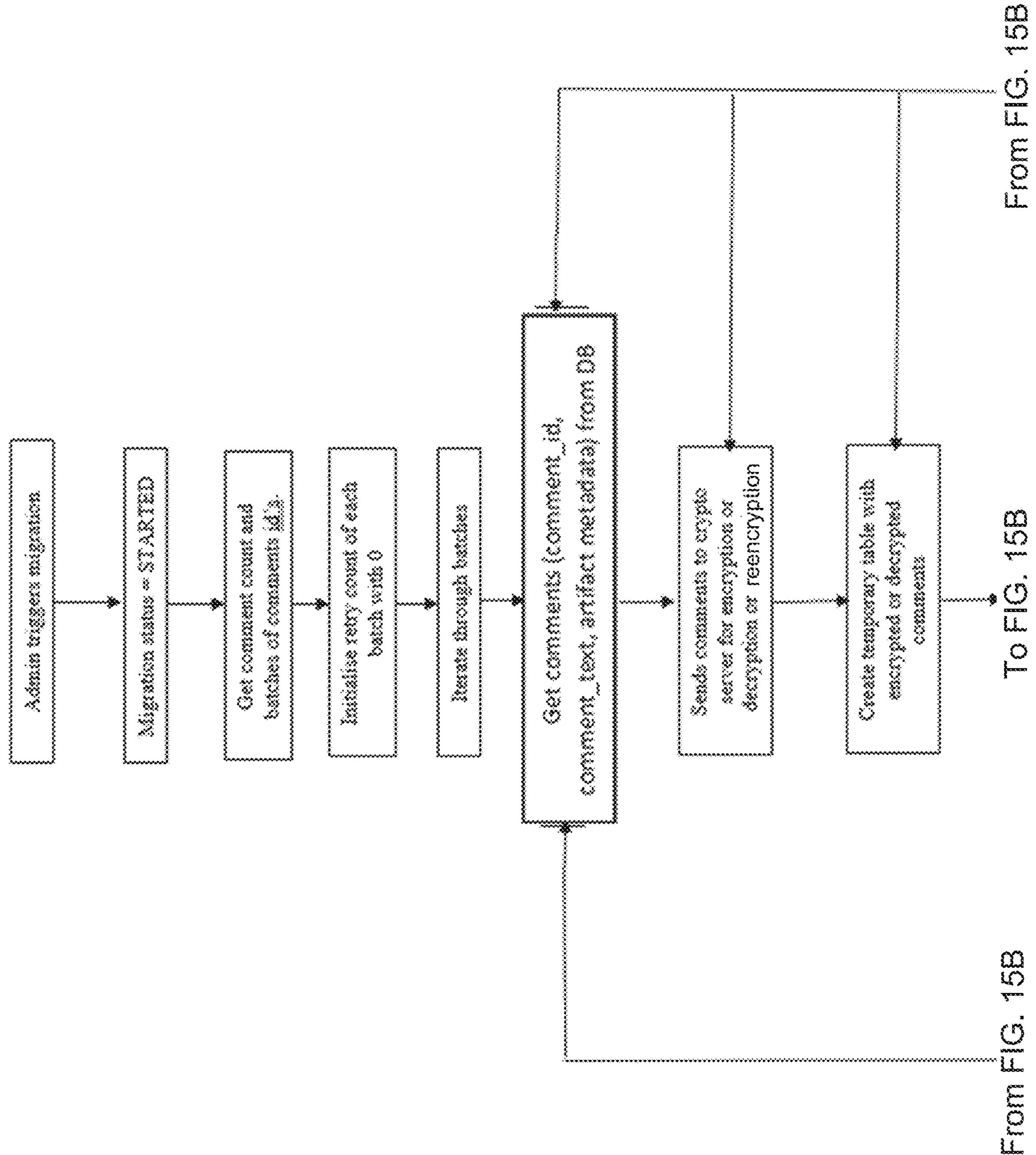
FIGS. 15A-B show a process flow according to an example.
Figure 15B:
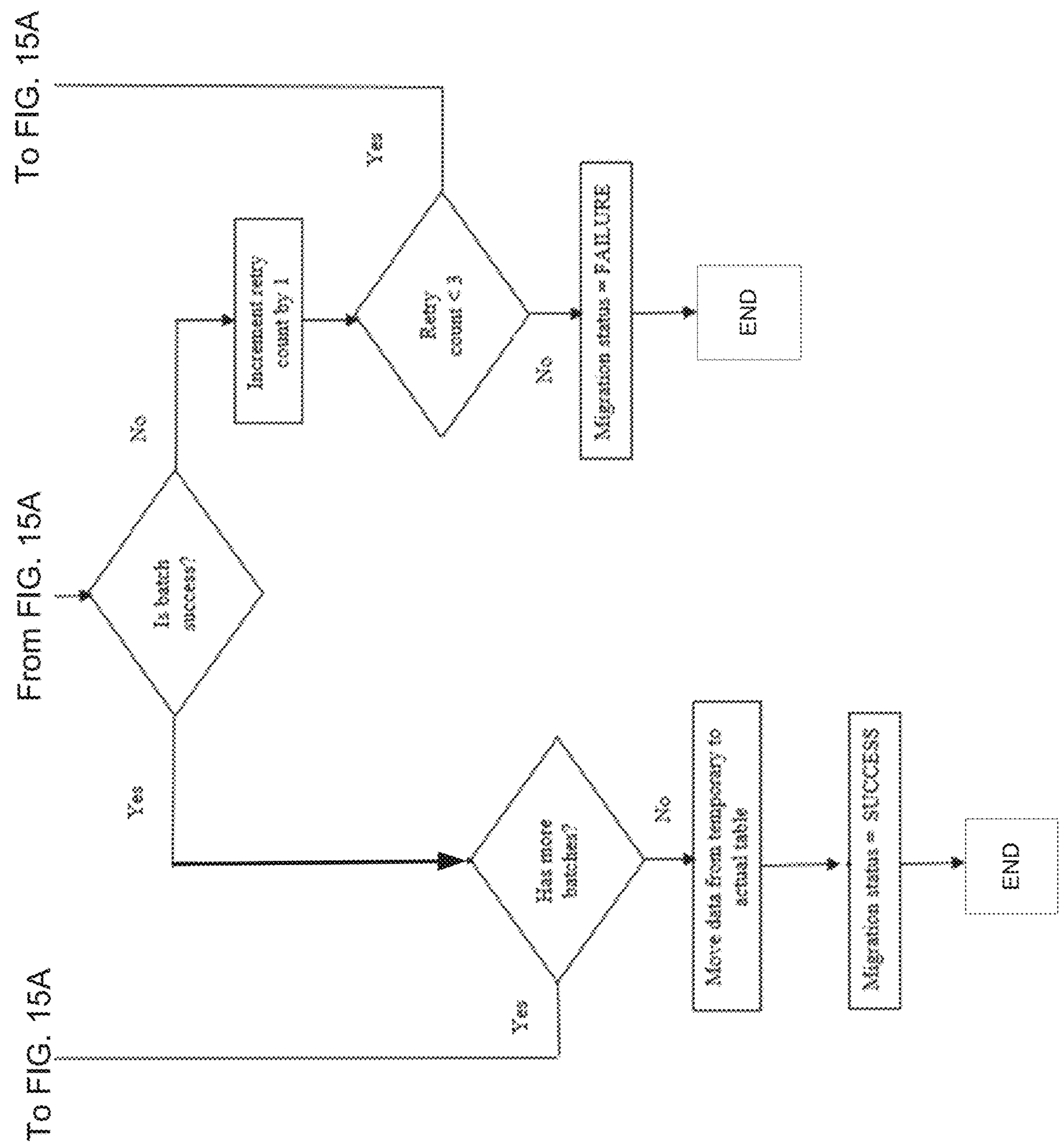

FIGS. 15A-B (discussed later below) show details of a comment migration operation. FIG. 9 is a UI screen shot 900 showing an encryption option 902. In the screen shot that is shown, toggle 904 is set activated, instructing an onboarding migration operation. Setting that toggle to unactivated, would instead instruct an offboarding migration operation. Activating the encrypt button 906 would instruct a key rotation migration operation.

As part of an offboarding procedure, a customer may want to opt-out of the encryption feature. Existing encrypted comments would be decrypted and reverted to the standard comment behavior, being stored as plain text by default.

As part of key rotation procedure, encrypted comments would be decrypted with the current key and re-encrypted with new key. Such key rotation may be due to a security policy or system compromise.

Further description of comment storage according to this example, are now provided. In order to maintain data confidentiality, the browser-based solution ensures that no comments reach SAC in plain-text.

Embodiments elevate security and flexibility of comment storage, by introducing an encryption key per-artifact, based up on artifact metadata. First, metadata from an analytic artifact (e.g., story, model) is sent to on-premise crypto server.

The On-premise crypto server uses this analytic artifact metadata in order to generate a key. According to particular embodiments, each artifact's comment can be encrypted with different key—thereby adding another layer of protection to comments Specific embodiments may implement comment security with even more granularity. This can be accomplished, e.g., by including widget, comment metadata also for key generation.

Figure 11:
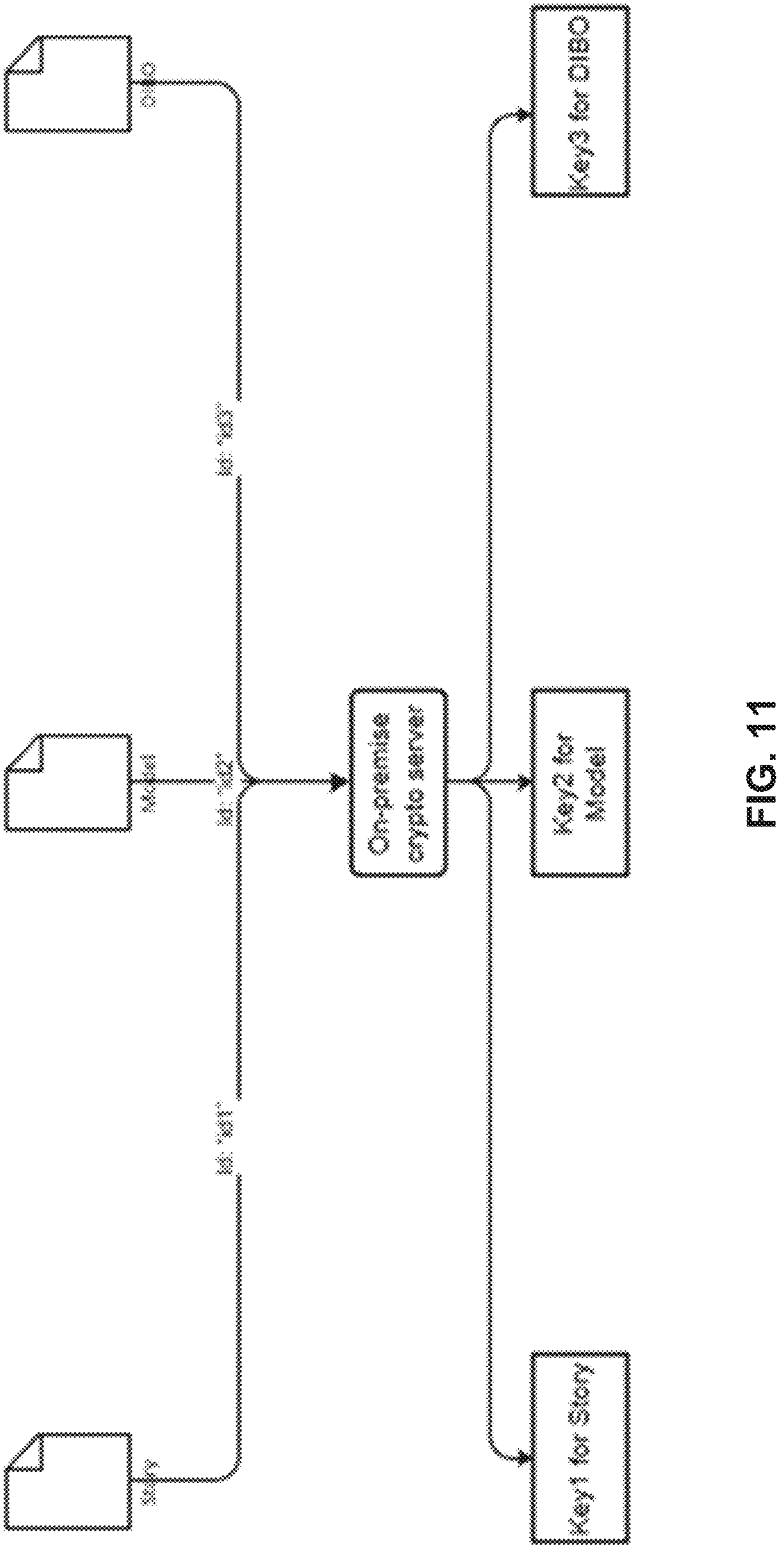
FIG. 11 shows analytic artifacts sending metadata for key generation.

FIG. 10 sample story metadata 1000 with attributes indicated as 1002. FIG. 11 shows each analytic artifact sending metadata for key generation according to an embodiment.

Depending upon the particular embodiment, analytic artifacts can be:

- accessible to different categories of users, and/or
- classified into different security levels.

Thus, an analytic artifact belonging to a "high" security level could be encrypted with different key, as compared to an analytic artifact belonging to a different (e.g., "medium" or "low") security level. This could ensure that different analytic artifacts are encrypted with different keys, rendering plain text-based attacks less likely to succeed. Using different keys for different security levels, can also promote data confidentiality and reduce the scope of possible cryptographic attacks.

Figure 12:
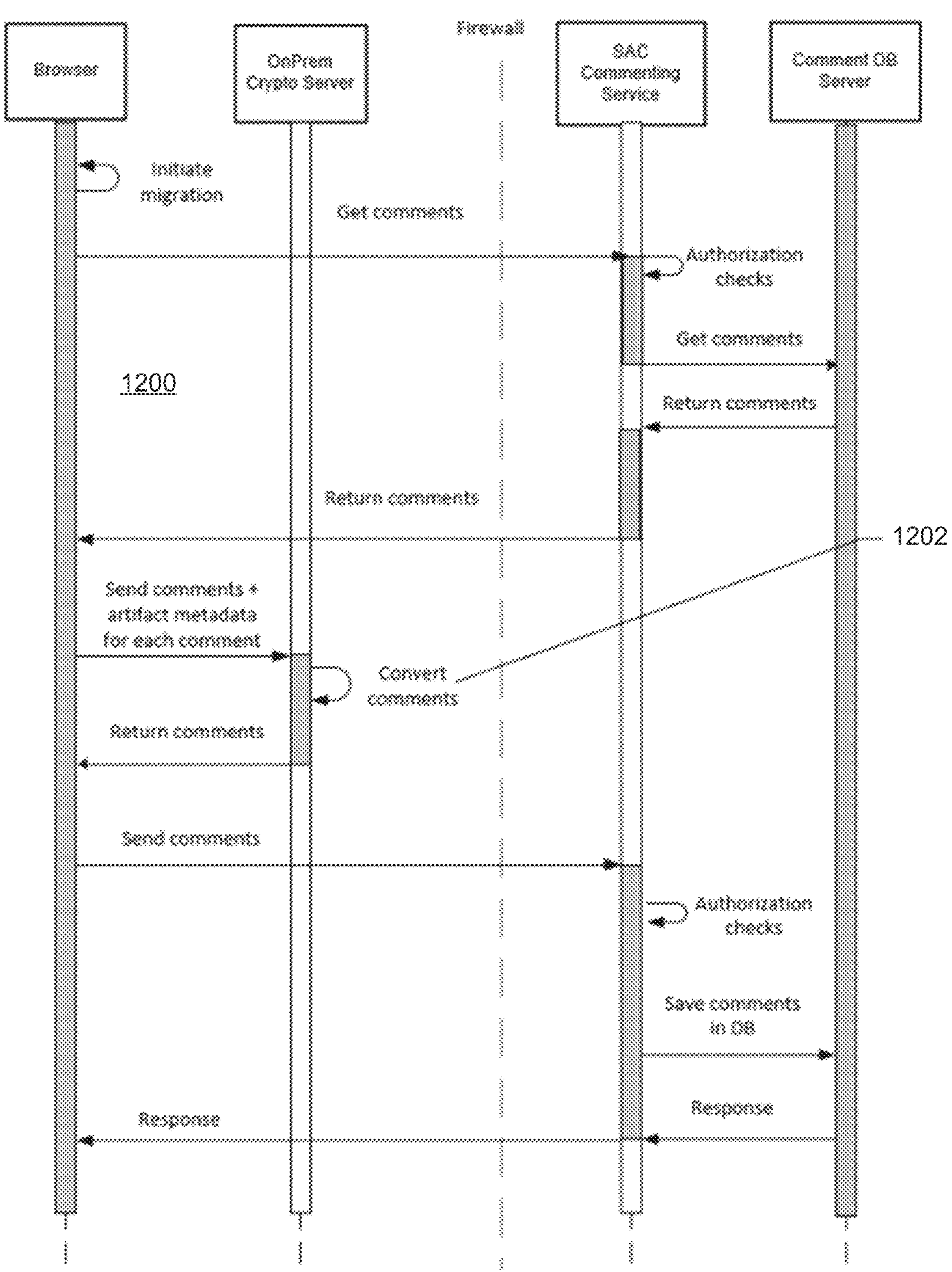
FIG. 12 shows an example process flow of migration according to an embodiment

In a browser orchestrated migration as described above, comments are fetched from commenting service and forwarded to on-premise crypto server for conversion and then saved back into commenting database. FIG. 12 shows an example process flow of migration 1200 according to an embodiment At the conversion shown at 1202, based on whether the workflow is:

- encryption: convert from plain-text to encrypted text comment;
- decryption: convert from encrypted to plain-text comment; or
- re-encryption: convert from encrypted (key1) to encrypted (key2) comment.

According to embodiments, the key(s) for the above workflows will be determined based upon artifact metadata.

Figure 13:
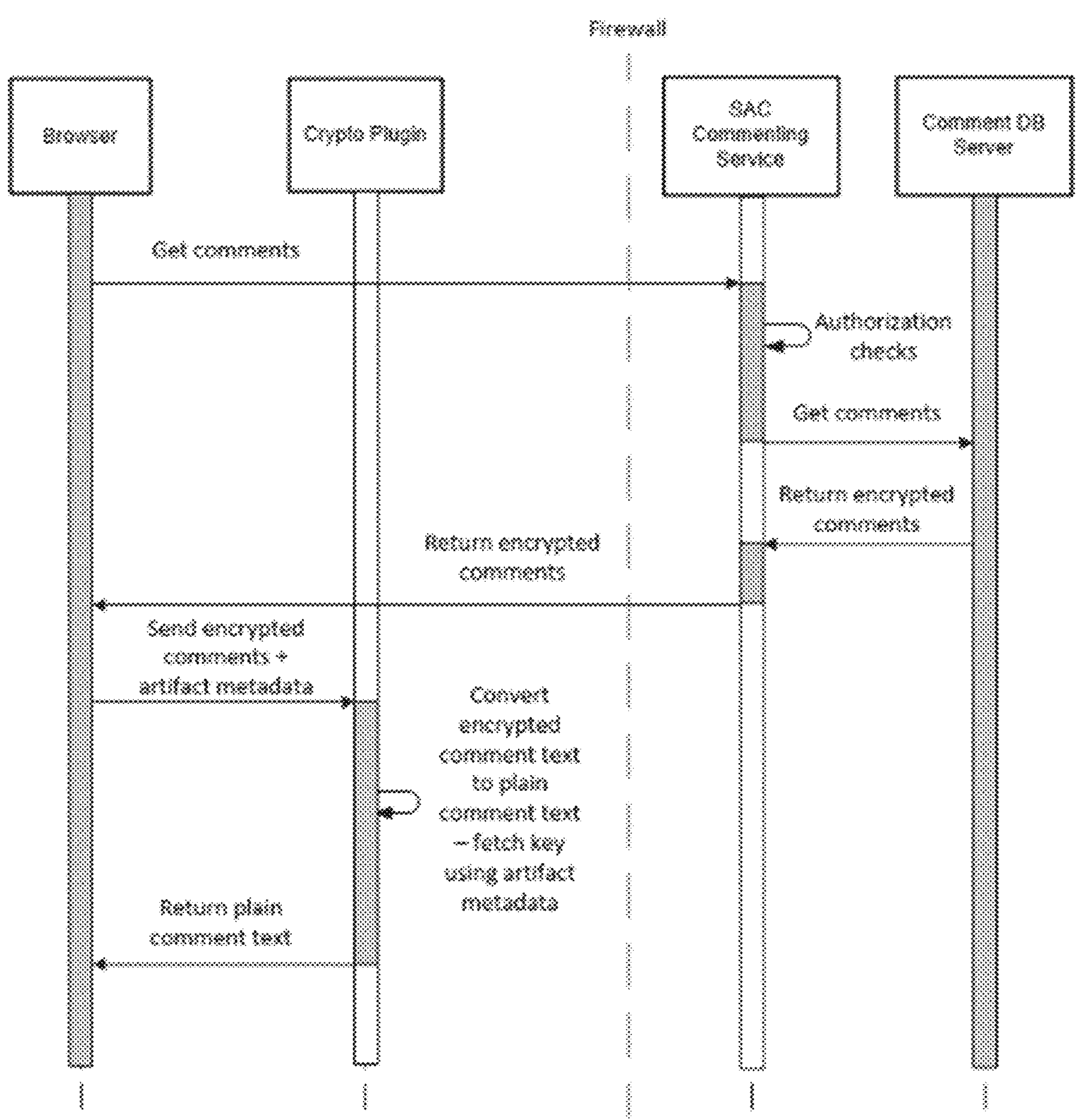
FIG. 13 shows an example process of a get comment work flow according to an embodiment.
Figure 14:
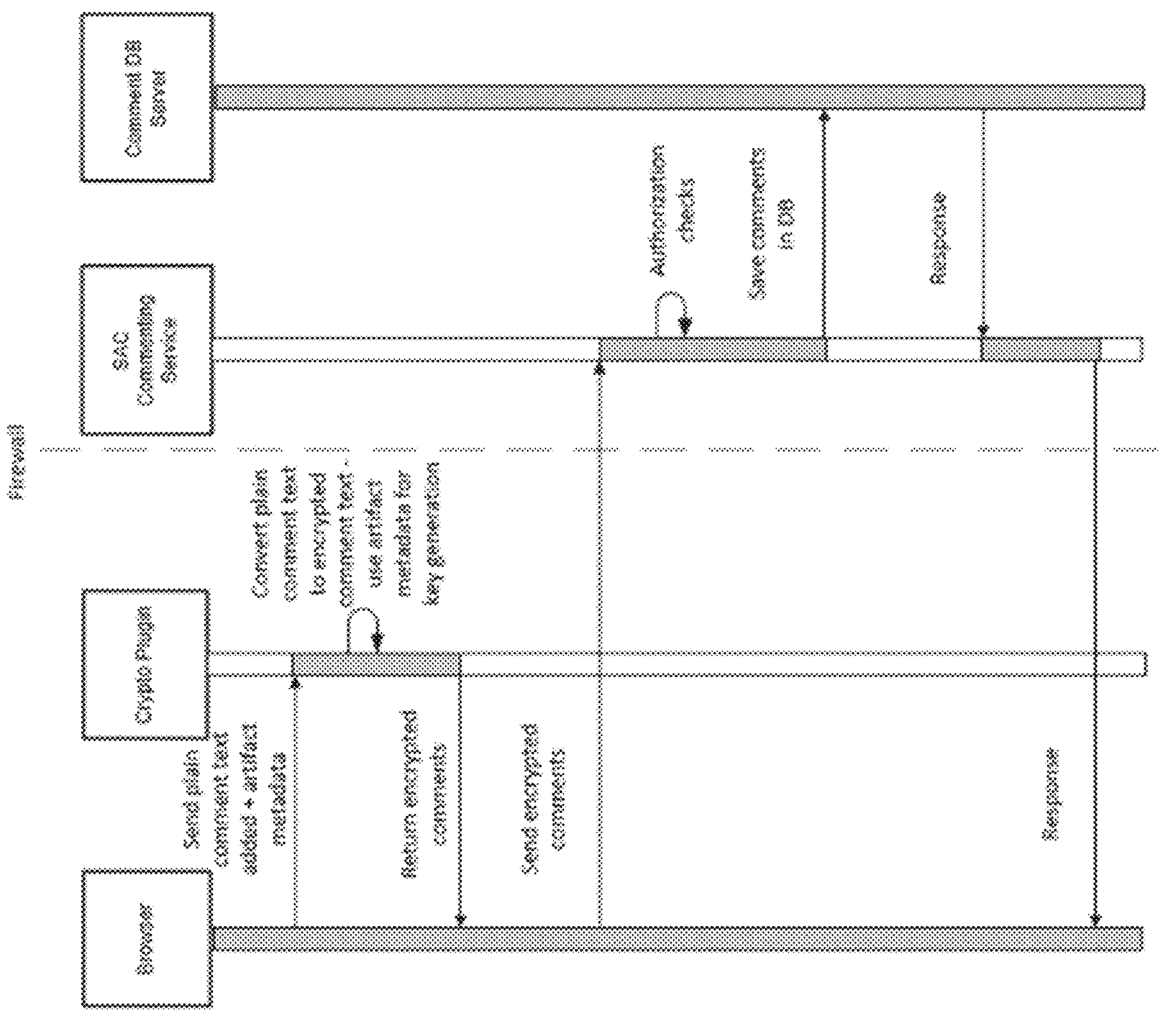
FIG. 14 shows an example process flow of an add comment work flow according to an embodiment.

Commenting operations (e.g., to get or add comment) post-migration, also involve on-premise crypto server. FIG. 13 shows an example process of a get comment work flow according to an embodiment. FIG. 14 shows an example process flow of an add comment work flow according to an embodiment.

According to this example, the on-premise crypto server is responsible for encrypting and decrypting the plain comment text. The SAC Commenting service is responsible for storage of encrypted comment text. Without the right on-premise crypto server, SAC would not be able to decrypt or make sense of the cryptic text.

FIGS. 15A-B summarizes actions involved during migration according to an embodiment.

1. Admin provides on-premise crypto server details and triggers migration
2. Set the migration status to STARTED
3. Get comment count and generate batches of comments id's
   a. Query for comment count
   b. Iterate to create comment id batches of 1000 each
   c. Send comment count and batches
4. Iterator 'n' threads, here 'n' is user configurable
   a. Each batch per thread
      1. Get comments (comment_id, comment_text, artifact_metadata) from DB
      2. Sends comments to on-premise crypto server to encryption or decryption
      3. Inserts temporary table with encrypted or decrypted comments
   b. Is batch successful:
      1. Release thread back to thread pool
      2. Check if more batches are pending
      3. If yes, execute next batch
   c. If any of the steps in 4.a above fails, then retry that step until its successful or retry max 3 times
      1. Retry count is 3 and batch processing failed then
         1. Sets the migration status to completed—FAILURE
         2. Stop migration operation
      2. Retry count is less than 3 and batch processing successful then
         1. Retry count is zero
         2. Continue step 4.b
   d. After batches are successfully processed, then comments are moved to actual table
      1. Sets the migration status to completed—SUCCESS Embodiments may offer one or more benefits. For example, embodiments could offer flexibility to a customer.

In particular, a customer can selectively control security of comments, per their individual company security policy. Thus, embodiments can elevate security of high profile comments (e.g., those made by top level management) over lower profile comments (e.g., those made by regular users).

Another possible benefit of embodiments is reduced consumption of available system resources. Encryption and decryption can be memory and CPU intensive, particularly for bulk migration operations such as re-keying that involve both decryption and reencryption.

However, if different keys are used for different artifacts (based on artifact metadata), an administrator can choose to rotate only those keys/artifacts which are compromised or expired. This reduces downtime and preserves the availability of (e.g., CPU, memory, network) resources in order to perform other vital system functions.

Still another possible benefit offered by embodiments is improved security. As a diversity of keys are being used for comment storage, a system is less vulnerable to an attacker employing a brute force approach in order to try and decode all comments.

Moreover, where an encryption key is same for all comments, the complete comment data could be compromised. As attacks may be directed against isolated/independent systems, it could be difficult to detect/audit malicious activity.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising, in response to a first comment migration instruction, receiving behind a firewall from a cloud storage, a first comment and first metadata, selecting a first key based upon the first metadata, transforming the first comment according to the first key based upon the first metadata, to create a first transformed comment, forwarding the first transformed comment for communication across the firewall to the cloud storage, further in response to the comment migration instruction, receiving behind the firewall from the cloud storage, a second comment and second metadata, transforming the second comment according to a second key based upon the second metadata, to create a second transformed comment, and forwarding the second transformed comment for communication across the firewall to the cloud storage.

Example 2. The computer implemented system and method of Example 1 wherein the metadata comprises a time.

Example 3. The computer implemented system and method of Examples 1 or 2 wherein the metadata comprises at least one of:

a creator of the first comment, a collaboration team, a role, or a security level.

Example 4. The computer implemented system and method of Examples 1, 2, or 3 wherein the comment relates to an artifact, and the metadata comprises a type of the artifact.

Example 5. The computer implemented system and method of Example 4 wherein the type comprises a story, a model, or an application.

Example 6. The computer implemented system and method of Examples 1, 2, 3, 4, or 5 wherein the metadata comprises a relation of the first comment to a different comment.

Example 7. The computer implemented system and method of Examples 1, 2, 3, 4, 5, or 6 wherein, the migration instruction comprises onboarding, and the transforming comprising encrypting the first comment using the first key.

Example 8. The computer implemented system and method of Examples 1, 2, 3, 4, or 6 wherein, the migration instruction comprises key rotation or offboarding, and the transforming comprises decrypting the first comment using the first key.

Example 9. The computer implemented system and method of Example 8 wherein, the migration instruction comprises key rotation, the method further comprises selecting a third key based upon the comment metadata, and the transforming further comprises reencryption the first comment using the third key.

Example 10. The computer implemented system and method of Examples 1, 2, 3, 4, 6, 7, 8, or 9 further comprising generating the key from the metadata.

Example 11. The computer implemented system and method of Examples 1, 2, 3, 4, 5, 6, 7, 8, or 9 wherein prior to receipt of the first comment, the first key is already extant behind the firewall.

Figure 16:
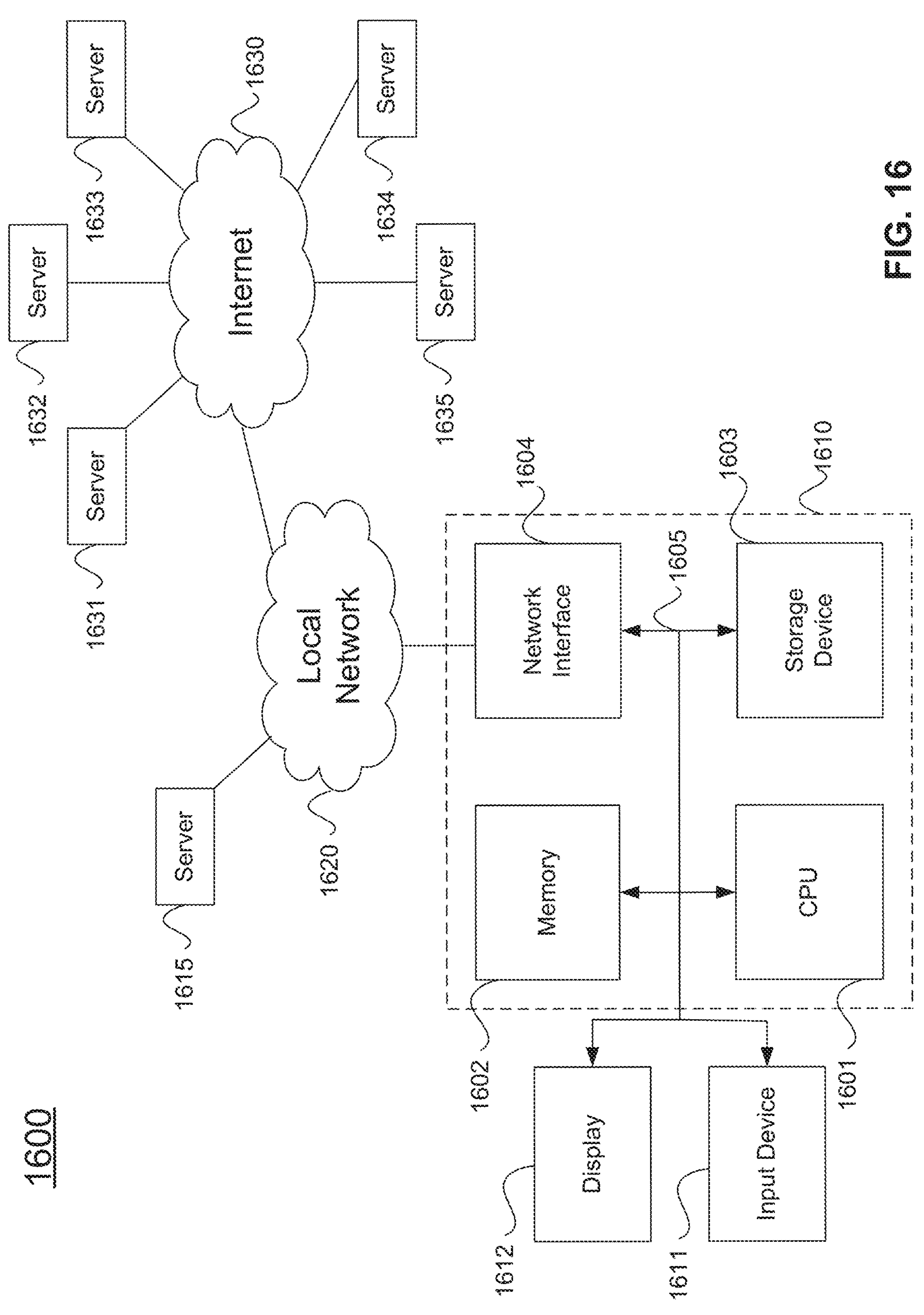
FIG. 16 illustrates an example computer system.

An example computer system 1600 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a Light Emitting Diode (LED) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method performed by one or more computer systems located behind a network firewall, the method comprising:

receiving, from a user, a first instruction for performing a comment encryption onboarding operation, the comment encryption onboarding operation being configured to turn on encryption of comments created or provided by the user with respect to one or more software applications; and executing the comment encryption onboarding operation by:

determining a number of existing unencrypted comments created or provided by the user that are stored in unencrypted form in a database of a commenting service, the commenting service being located outside of the network firewall;

dividing the plurality of existing unencrypted comments into a first plurality of batches based on the determined number; and for each batch in the first plurality of batches:

requesting the batch from the commenting service, the batch including a subset of the existing unencrypted comments and associated metadata;

receiving the batch from the commenting service;

for each existing unencrypted comment in the batch:

generating a key based on the metadata associated with the existing unencrypted comment; and encrypting the existing unencrypted comment using the generated key, resulting in an encrypted comment; and transmitting the encrypted comments for the batch to the commenting service for storage in the database in encrypted form, wherein after execution of the comment encryption onboarding operation is complete, all future comments created or provided by the user are encrypted prior to being sent to the commenting service for storage in the database.

2. The method of claim 1 further comprising:

receiving, from the user, a second instruction for performing a comment encryption offboarding operation, the comment encryption offboarding operation being configured to turn off the encryption of comments created or provided by the user with respect to the one or more software applications; and executing the comment encryption offboarding operation by:

determining a number of existing encrypted comments created or provided by the user that are stored in encrypted form in the database of the commenting service;

dividing the plurality of existing encrypted comments into a second plurality of batches based on the determined number; and for each batch in the second plurality of batches:

requesting the batch from the commenting service, the batch including a subset of the existing encrypted comments and associated metadata;

receiving the batch from the commenting service;
decrypting each existing encrypted comment in the batch, resulting in a decrypted comment; and
transmitting the decrypted comments for the batch to the commenting service for storage in the database in unencrypted form.

3. The method of claim 1 further comprising:
receiving, from the user, a second instruction for performing a key rotation operation; and
executing the key rotation operation by:
determining a number of existing encrypted comments created or provided by the user that are stored in encrypted form in the database of the commenting service;
dividing the plurality of existing encrypted comments into a second plurality of batches based on the determined number; and
for each batch in the second plurality of batches:
requesting the batch from the commenting service, the batch including a subset of the existing encrypted comments and associated metadata;
receiving the batch from the commenting service;
for each existing encrypted comment in the batch:
decrypting the existing encrypted comment, resulting in a decrypted comment;
generating a new key based on the metadata associated with the existing encrypted comment; and
encrypting the decrypted comment using the new key, resulting in a re-encrypted comment; and
transmitting the re-encrypted comments for the batch to the commenting service for storage in the database in encrypted form.

4. The method of claim 1 wherein each existing unencrypted comment in each batch pertains to an artifact of the one or more software applications, and wherein the metadata associated with the existing unencrypted comment comprises a type of the artifact.

5. The method of claim 4 wherein the type comprises a model, a story, or an application.

6. The method of claim 1 wherein the metadata associated with each existing unencrypted comment in each batch comprises at least one of:
an identifier of the user;
a collaboration team; or
a security level.

7. The method of claim 1 wherein the metadata associated with each existing unencrypted comment in each batch comprises a relation of the existing unencrypted comment to another existing unencrypted comment.

8. The method of claim 1 wherein the metadata associated with each existing unencrypted comment in each batch comprises a time.

9. The method of claim 1 wherein the receiving of the first instruction, the determining of the number of existing unencrypted comments, the dividing the plurality of existing unencrypted comments into the first plurality of batches, the requesting of the batch from the commenting service, and the transmitting of the encrypted comments for the batch to the commenting service are performed by a migration engine of a web browser running on a first computer system behind the network firewall, and wherein the generating of the key and the encrypting of each existing unencrypted comment is performed by a second computer system behind the network firewall that is different from the first computer system.

10. The method of claim 1 wherein the metadata associated with each existing unencrypted comment in each batch includes a security level and wherein the key that is generated for the existing unencrypted comment is based on the security level, such that different security levels result in generation of different keys.

11. A non-transitory computer readable storage medium embodying a computer program for performing, by one or more computer systems located behind a network firewall, a method comprising:
receiving, from a user, a first instruction for performing a comment encryption onboarding operation, the comment encryption onboarding operation being configured to turn on encryption of comments created or provided by the user with respect to one or more software applications; and
executing the comment encryption onboarding operation by:
determining a number of existing unencrypted comments created or provided by the user that are stored in unencrypted form in a database of a commenting service, the commenting service being located outside of the network firewall;
dividing the plurality of existing unencrypted comments into a first plurality of batches based on the determined number; and
for each batch in the first plurality of batches:
requesting the batch from the commenting service, the batch including a subset of the existing unencrypted comments and associated metadata;
receiving the batch from the commenting service;
for each existing unencrypted comment in the batch:
generating a key based on the metadata associated with the existing unencrypted comment; and
encrypting the existing unencrypted comment using the generated key, resulting in an encrypted comment; and
transmitting the encrypted comments for the batch to the commenting service for storage in the database in encrypted form,
wherein after execution of the comment encryption onboarding operation is complete, all future comments created or provided by the user are encrypted prior to being sent to the commenting service for storage in the database.

12. The non-transitory computer readable storage medium of claim 11 wherein each existing unencrypted comment in each batch pertains to an artifact of the one or more software applications, and wherein the metadata associated with the existing unencrypted comment comprises at least one of:
a type of the artifact;
a unique identifier of the existing unencrypted comment;
an identifier of the user;
a collaboration team;
a relation of the existing unencrypted comment to another comment;
a time and/or date; or
a security level.

13. The non-transitory computer readable storage medium of claim 11 wherein the method further comprises:
receiving, from the user, a second instruction for performing a comment encryption offboarding operation, the comment encryption offboarding operation being configured to turn off the encryption of comments created or provided by the user with respect to the one or more software applications; and executing the comment encryption offboarding operation by:

determining a number of existing encrypted comments created or provided by the user that are stored in encrypted form in the database of the commenting service;

dividing the plurality of existing encrypted comments into a second plurality of batches based on the determined number; and for each batch in the second plurality of batches:

requesting the batch from the commenting service, the batch including a subset of the existing encrypted comments and associated metadata;

receiving the batch from the commenting service;

decrypting each existing encrypted comment in the batch, resulting in a decrypted comment; and transmitting the decrypted comments for the batch to the commenting service for storage in the database in unencrypted form.

14. The non-transitory computer readable storage medium of claim 11 wherein the method further comprises:

receiving, from the user, a second instruction for performing a key rotation operation; and executing the key rotation operation by:

determining a number of existing encrypted comments created or provided by the user that are stored in encrypted form in the database of the commenting service;

dividing the plurality of existing encrypted comments into a second plurality of batches based on the determined number; and for each batch in the second plurality of batches:

requesting the batch from the commenting service, the batch including a subset of the existing encrypted comments and associated metadata;

receiving the batch from the commenting service;

for each existing encrypted comment in the batch:

decrypting the existing encrypted comment, resulting in a decrypted comment;

generating a new key based on the metadata associated with the existing encrypted comment; and encrypting the decrypted comment using the new key, resulting in a re-encrypted comment; and transmitting the re-encrypted comments for the batch to the commenting service for storage in the database in encrypted form.

15. A computer system comprising:

one or more processors; and a software program executable on said computer system, the software program being configured to cause a processor of the one or more processors to:

receive, from a user, a first instruction for performing a comment encryption onboarding operation, the comment encryption onboarding operation being configured to turn on encryption of comments created or provided by the user with respect to one or more software applications; and execute the comment encryption onboarding operation by:

determining a number of existing unencrypted comments created or provided by the user that are stored in unencrypted form in a database of a commenting service, the commenting service being separated from the computer system by a network firewall;

dividing the plurality of existing unencrypted comments into a first plurality of batches based on the determined number; and for each batch in the first plurality of batches:

requesting the batch from the commenting service, the batch including a subset of the existing unencrypted comments and associated metadata;

receiving the batch from the commenting service;

for each existing unencrypted comment in the batch:

generating a key based on the metadata associated with the existing unencrypted comment; and encrypting the existing unencrypted comment using the generated key, resulting in an encrypted comment; and transmitting the encrypted comments for the batch to the commenting service for storage in the database in encrypted form, wherein after execution of the comment encryption onboarding operation is complete, all future comments created or provided by the user are encrypted prior to being sent to the commenting service for storage in the database.

16. The computer system of claim 15 wherein each existing unencrypted comment in each batch pertains to an artifact of the one or more software applications, wherein the metadata associated with the existing unencrypted comment comprises a type of the artifact, and wherein the type of the artifact comprise one of:

a model;

a story; or an application.

17. The computer system of claim 15 wherein the software program further causes the processor to:

receive, from the user, a second instruction for performing a comment encryption offboarding operation, the comment encryption offboarding operation being configured to turn off the encryption of comments created or provided by the user with respect to the one or more software applications; and execute the comment encryption offboarding operation by:

determining a number of existing encrypted comments created or provided by the user that are stored in encrypted form in the database of the commenting service;

dividing the plurality of existing encrypted comments into a second plurality of batches based on the determined number; and for each batch in the second plurality of batches:

requesting the batch from the commenting service, the batch including a subset of the existing encrypted comments and associated metadata;

receiving the batch from the commenting service;

decrypting each existing encrypted comment in the batch, resulting in a decrypted comment; and transmitting the decrypted comments for the batch to the commenting service for storage in the database in unencrypted form.

18. The computer system of claim 15 wherein the software program further causes the processor to:

receive, from the user, a second instruction for performing a key rotation operation; and execute the key rotation operation by:

determining a number of existing encrypted comments created or provided by the user that are stored in encrypted form in the database of the commenting service;

dividing the plurality of existing encrypted comments into a second plurality of batches based on the determined number; and for each batch in the second plurality of batches:

requesting the batch from the commenting service, the batch including a subset of the existing encrypted comments and associated metadata;

receiving the batch from the commenting service;

for each existing encrypted comment in the batch:

decrypting the existing encrypted comment, resulting in a decrypted comment;

generating a new key based on the metadata associated with the existing encrypted comment; and encrypting the decrypted comment using the new key, resulting in a re-encrypted comment; and transmitting the re-encrypted comments for the batch to the commenting service for storage in the database in encrypted form.

* * * * *